Figure 1:
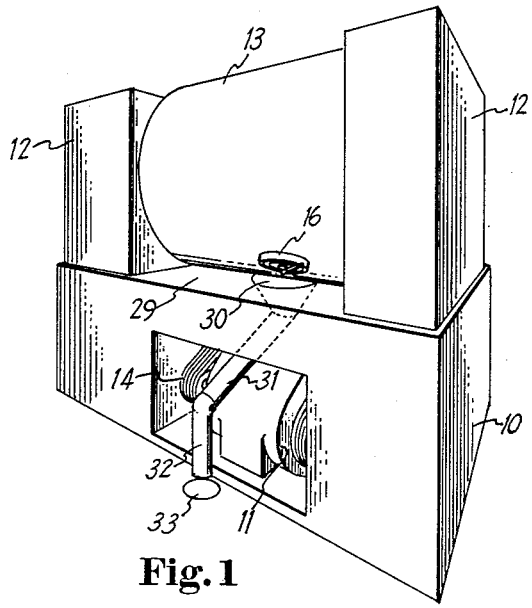

Oct. 6, 1964 W. H. LEUZE 3,151,845
VALVE, PLUG AND DRAIN ARRANGEMENT FOR MIXING BOWLS
Filed May 14, 1962 2 Sheets-Sheet 1

INVENTOR.
WILLIAM H. LEUZE,

BY
Yungblut, Melville, Strauss + Foster

ATTORNEYS.

Oct. 6, 1964  W. H. LEUZE  3,151,845
VALVE, PLUG AND DRAIN ARRANGEMENT FOR MIXING BOWLS
Filed May 14, 1962  2 Sheets-Sheet 2

INVENTOR.
WILLIAM H. LEUZE,
BY
Yungblut, Melville, Strasser + Foster
ATTORNEYS.

United States Patent Office 3,151,845
Patented Oct. 6, 1964

3,151,845
VALVE, PLUG AND DRAIN ARRANGEMENT
FOR MIXING BOWLS
William H. Leuze, Cincinnati, Ohio, assignor to Triumph
Manufacturing Company, Cincinnati, Ohio, a corporation of Ohio
Filed May 14, 1962, Ser. No. 194,350
2 Claims. (Cl. 259—30)

This invention resides is the provision of a drain arrangement by means of which wash water employed in the final clean-out of food mixing bowls may be readily disposed of.

In the food industry cleanliness is of the essence. In commercial establishments food ingredients are often handled on a very large basis, requiring the use of large machinery. One example of this lies in the baking field wherein it is not uncommon to employ mixing devices, for example, capable of mixing 2,000 pounds of dough or the like. The vessel in which the dough or other food ingredient is placed is usually termed a bowl. Often this bowl is in the shape of a large cylinder. This cylinder is mounted in suitable framework and connected to power means for rotating it as desired. Various kinds of agitators are employed within the cylinder to insure proper mixing of the food ingredients.

After a quantity of food ingredient has been mixed to the extent desired, and removed from the bowl or mixing cylinder, it is necessary to thoroughly wash out the bowl before another batch of food ingredient is mixed. It is very important that the highest standards of cleanliness are maintained. After certain preliminary cleaning steps have been taken, it is usual to subject the mixing bowl to a final cleansing by a suitable wash water. This wash water, of course, must be removed from the bowl before further mixing may take place.

An important object of this invention is to provide a drain arrangement which employs a minimum of moving or movable parts, simply arranged, so as to eliminate crevices and the like in which food ingredients and/or wash water might accumulate, thereby helping to insure the utmost in sanitary conditions.

A further object of the invention is to provide a drain plug which is accessible from outside of the mixing chamber so that it may be removed without the operator having to work from within the chamber.

Another object of the invention is to provide a drain plug which is easily removed, and replaced, and which provides a positive, absolute seal when in closed position.

Another object of the invention is to provide a valve frame which may be fixed in the mixing bowl and which is adapted to receive the valve plug in simple and efficient measure.

It is also an object of this invention to arrange the drain means so that the mixing cylinder does not have to be removed from the machine frame and so that the wash water may be removed from the cylinder and machine to a point of disposal removed from both.

Figure 2:
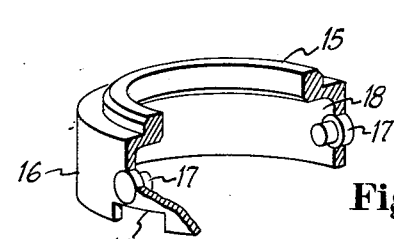
Figure 3:
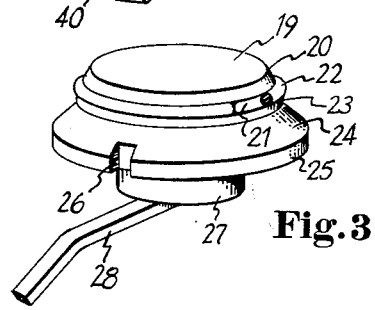
Figure 4:
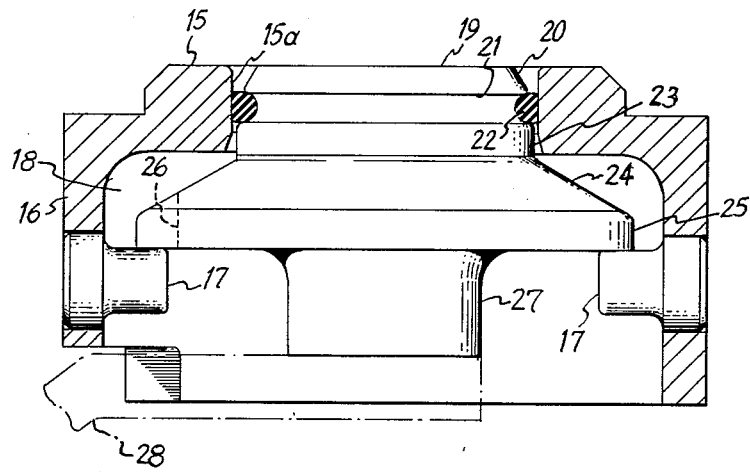
Figure 5:
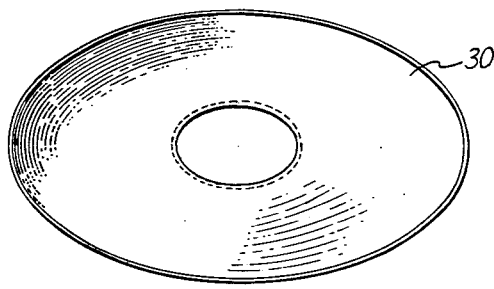
Figure 6:
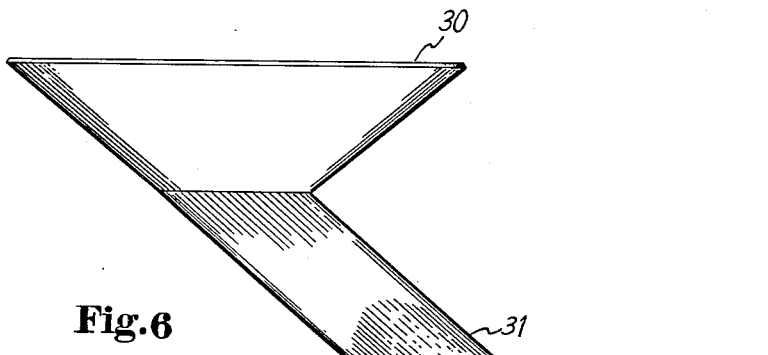
Figure 7:
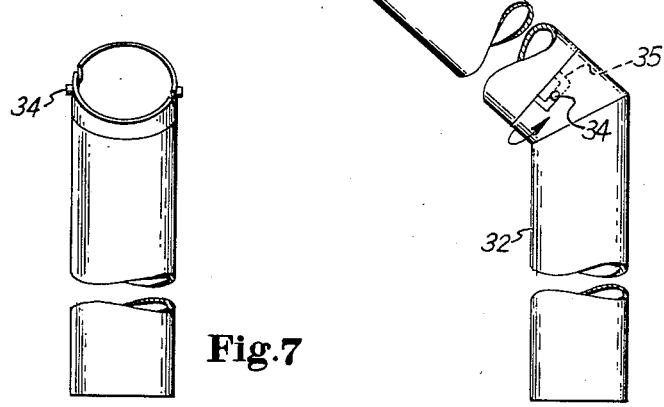

These and other objects of this invention will become apparent from the description to follow with reference to the accompanying drawings, in which drawings like numerals are employed to designate like parts and in which:

FIGURE 1 is a perspective view of a mixing machine, mixing chamber and the drain apparatus of this invention, FIGURE 2 is a fragmentary perspective view, partly in section, of the valve frame which constitutes a part of this invention, FIGURE 3 is a perspective view of the valve plug which constitutes a part of this invention, FIGURE 4 is an enlarged view, partly in section, showing the valve plug in closed position within the valve frame, FIGURE 5 is a top perspective view of the drain spout forming a part of the drain apparatus of this invention, FIGURE 6 is a side elevation, with parts broken away, showing a portion of the drain apparatus, and FIGURE 7 is a front elevation of the lower portion of the drain apparatus of FIGURE 6.

Although this invention is shown and described in connection with large cylinders for mixing dough and the like, it is to be understood that the size of the mixing chamber does not constitute a limitation on the invention. Nor does the fact that the invention has particular application in the food mixing industry mean that the invention is to be considered as limited only to this field.

Referring now to FIGURE 1, the mixing machine to which this invention has been applied is comprised of a base frame or cabinet 10 which houses the motor 11 and which includes compartments 12 in which suitable bearing mechanisms for supporting the mixing chamber are located. The mixing chamber is illustrated as comprised of a large cylinder 13 which will be rotated on a horizontal axis by drive means generally indicated at 14 from the motor 11. The parts so far described are conventional and well known in the art, thus details of the motor, drive means and bearing mechanisms have not been disclosed.

The cylinder 13 is provided with a circular orifice in which is fixed a valve frame 15. The valve frame may be fixed within the orifice of the cylinder 13 so that the innermost portion thereof will be flush with the interior wall of the cylinder. This frame 15 includes a flange 16 which extends outwardly beyond the outer wall of the cylinder 13. A pair of pins or lugs 17 are fixed in the flange 16. These pins 17 are positioned within the flange 16 so as to provide a clearance area 18. All of this is clearly shown in FIGURE 2.

Referring now to FIGURE 3, the drain plug includes the portion 19 which tapers outwardly as indicated at 20 where it joins an annular groove 21 adapted to receive a seal which is preferably an O-ring 22. The groove 21 is located in a cylindrical upright portion 23 which terminates in the plug portion 19. From the lower portion of the upright member 23 the drain plug is tapered outwardly as indicated at 24 to the flange 25. The flange 25 is provided with a notch 26 which is large enough to receive a pin 17. A cylindrical stem 27 depends from the underside of the flange 25. A handle 28 is fixed to this stem.

Mounted within the top 29 of the base or cabinet 10 of the mixing machine is a drain spout 30. This spout 30 is located so as to be in alignment with the valve frame and drain plug when they are at their lowermost position. A drainpipe 31 extends downwardly and outwardly of the cabinet 10 towards the rear of the mixing machine. Connected to the lower end of the drain pipe 31 is a drain pipe elbow 32 which terminates adjacent the floor drain 33. The pipe 31 and elbow 32 are preferably connected by means of the pin and bayonet slot arrangement 34, 35.

The drain plug is easily positioned in the valve frame. To insert the plug one engages the flange 25 over a pin 17, the portion 23 carrying the O-ring 22 having first been started within the valve frame portion 15a, whereafter the plug is brought to the position of FIGURE 4. In doing this the notch 26 enables the pin 17 to be cleared, following which the plug is rotated a small amount so that it is then supported within the valve frame on the pair of pins 17. In this position the O-ring 22 effects a tight seal with the valve frame portion 15a.

It will be apparent that the valve plug may readily be removed simply by rotating the plug to bring the notch 26 of the flange 25 in alignment with a pin 17, all of which may be accomplished easily by proper manipulation of the handle 28, whereafter the valve plug is pulled from the valve frame. The slot 40 in flange 16, which slot is beneath the pin 17, see FIGURE 2, acts as a stop for the handle 28 in either position, i.e., to remove the plug, or to close the drain properly.

It is to be understood that modifications may be made in this invention without departing from the scope and spirit thereof. It is to be further understood that although the invention has been described and illustrated as including certain structures and particular arrangements, these structures and arrangements are not to constitute a limitation on the invention except insofar as they are specifically included in the subjoined claims. Having thus described the invention, therefore, what is claimed as new and what is desired to be protected by United States Letters Patent is:

1. In a mixing machine (10) having a rotatable mixing chamber (13) and means (11) to rotate the chamber; drain apparatus including a drain valve frame (15) fixed within the wall of said chamber, said frame having an annular bearing portion (15a) and a depending annular flange (16) and a pair of opposed pins (17) fixed in said flange and extending inwardly thereof; said drain apparatus also including a cylindrical plug member (23) having sealing means (22) thereon, said sealing means engaging said bearing portion to effect a seal, and said plug member having a depending outwardly extending rim (25) having a notch (26) to pass a said pin, the diameter of said rim being smaller than the diameter of said flange and greater than the distance between the inner ends of said pins; whereby when said plug member is engaged within said bearing portion said rim is supported on said pins.

2. In the machine of claim 1, an elongated handle (28) fixed to an extension (27) of said plug member and extending radially outwardly therefrom, whereby said plug member may readily be engaged in said valve frame by tilting the plug to engage the rim (25) over a pin (17), starting the member (23) into the bearing portion (15a), thereafter moving the rim (25) so that the notch (26) clears the other pin (17), and rotating the plug so as to move the notch out of alignment with the pin.

References Cited in the file of this patent

UNITED STATES PATENTS

| | | |
|---|---|---|
| 75,065 | Slade | Mar. 3, 1868 |
| 107,050 | Holmes | Sept. 6, 1870 |
| 151,381 | Graham | May 26, 1874 |
| 208,292 | Carroll | Sept. 24, 1878 |
| 1,690,735 | Lathrop | Nov. 6, 1928 |
| 2,665,028 | Hintz | Jan. 5, 1954 |

FOREIGN PATENTS

| | | |
|---|---|---|
| 327,256 | Great Britain | Apr. 3, 1930 |